United States Patent

[11] 3,621,287

[72] Inventor Victor S. Peterson
Sandusky, Ohio

[21] Appl. No. 76,899
[22] Filed Sept. 30, 1970
[45] Patented Nov. 16, 1971
[73] Assignee The United States of America as represented by the Administrator of the National Aeronautics and Space Administration

[54] SOLID-STATE REMOTE CIRCUIT SELECTOR SWITCH
13 Claims, 1 Drawing Fig.

[52] U.S. Cl. .......... 307/241, 307/223 B, 307/252 J, 307/252 K, 307/284, 307/304, 307/317, 328/106
[51] Int. Cl. .......... H03k 17/00
[50] Field of Search .......... 307/241, 242, 220 B, 221 B, 222 B, 223 B, 224 B, 225 B, 223, 235, 284, 252 J, 252 K; 328/75, 97, 103, 106, 152

[56] References Cited

UNITED STATES PATENTS

| | | | |
|---|---|---|---|
| 3,260,861 | 7/1966 | Dalley .......... | 307/224 B |
| 3,316,451 | 4/1967 | Silberman .......... | 307/223 B X |
| 3,564,282 | 2/1971 | Vogelsberg .......... | 307/223 B X |

*Primary Examiner*—Donald D. Forrer
*Assistant Examiner*—L. N. Anagnos
*Attorneys*—N. T. Musial, J. A. Mackin and J. R. Manning

ABSTRACT: A plurality of controlled rectifiers each associated with a respective load to be energized are provided. Gate circuitry is provided for each controlled rectifier such that each controlled rectifier is sensitive to a control voltage that falls within certain limits. The limits are chosen to provide nonoverlapping ranges for the controlled rectifiers. Local selector circuits each include a bias voltage source whose output falls within respective ones of the nonoverlapping ranges of the gate circuits of the controlled rectifiers. Switch means are provided whereby the voltage of the bias sources may be selectively applied to the gate circuits of the controlled rectifiers.

PATENTED NOV 16 1971 3,621,287
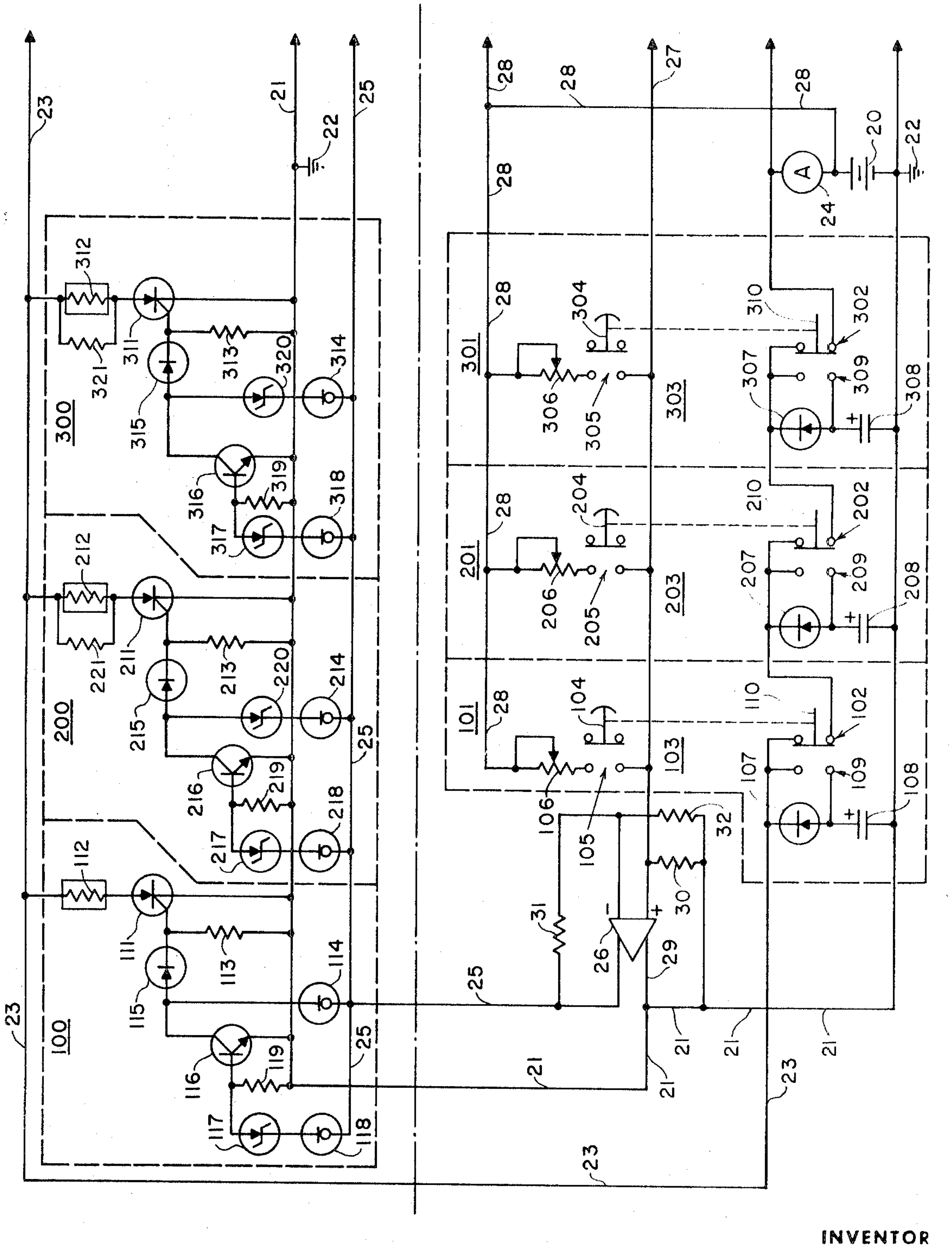
INVENTOR
VICTOR S. PETERSON
BY Norman T. Musial
James A. Mackin
ATTORNEYS

SOLID-STATE REMOTE CIRCUIT SELECTOR SWITCH

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates to control circuits and is directed more particularly for selectively energizing remote or inaccessible load circuits by means of local selector circuits.

In the past, remotely located utilization devices have been activated by providing a local switch for each utilization device and by connecting each local switch to a suitable relay or contactor located near each utilization device. Such an arrangement permitted relatively thin, lightweight wires to be utilized between the switches and the contactors, and at the same time, allowed the heavy, current leads connected between the contactors and the utilization devices to be short. Of course, a great number of interconnecting leads are required between the local switches and the remote relays or contactors, depending upon the number of utilization devices to be used.

More recently, transistors and other semiconductors have replaced relays and contactors in some switching circuitry. In general, however, an excessive number of interconnecting leads are required between the local switches and the remote utilization circuits.

Additionally, because of the relays and capacitors involved, circuits of the foregoing type are unsuitable for use in high G environments, such as for example, on a rotating body.

OBJECTS AND SUMMARY OF THE INVENTION

It is an object of the invention to provide a solid-state remote circuit selector switching circuit in which the remote circuits may be located in high G environments with no loss or degrading of performance.

It is another object of the invention to provide circuitry in which any one of a plurality of remote switching circuits may be severally and selectively activated by respective local selector circuits.

Another object of the invention is to provide circuitry of the foregoing type in which no more than three electrical conductors need be connected between the local selector circuits and the remote switching circuits.

Still another object of the invention is to provide a solid-state remote circuit selector switching circuit which provides a continuous local indication identifying the activated switching circuit and the current drawn by it.

It is yet another object of the invention to provide a solid-state remote circuit selector switching circuit wherein any of the remote switching circuits may be activated in any desired order of sequence.

In summary the invention provides circuitry for selectively activating a plurality of remotely located electrical utilization devices by means of respective local selector switches, only three interconnecting leads being required between remote devices and the selector circuits.

BRIEF DESCRIPTION OF THE DRAWING

The single FIGURE is a schematic diagram of the circuitry embodying the invention.

DESCRIPTION OF THE PREFERRED EMBODIMENT

Referring to the single FIGURE it will be seen that remote circuit selector switching circuitry may include two or more remote switching circuits such as 100, 200 and 300 and respective local selector circuits 101, 201 and 301. Because the remote switching circuits are substantially identical, like numerals will be used to identify corresponding parts in the respective switching circuits except for the first digit which will correspond to the first digit of the numeral identifying a particular switching circuit. The numerals will be utilized in a like manner for the local selector circuits. It will be understood that additional switching circuits and selector circuits may be provided, if desired, within the limitations of good engineering practice.

The circuitry embodying the invention may be energized from a suitable DC source such as a battery 20 which has its negative pole or side connected to a ground return or common lead 21 which is grounded as at 22. The positive pole or side of the battery 20 is connected to a DC energizing lead 23 through serially connected, normally closed contact sets 102, 202, and 302 of relays 103, 203 and 303 and an ammeter 24.

To the end that a switching signal of the desired magnitude will be applied to the switching circuits 100, 200 and 300, there is provided a switching signal lead 25 connected to one side of the output of an amplifier 26 which has one side of its input connected to a bias voltage lead 27. To produce voltage on the bias voltage lead 27 there is provided a pushbutton contactor 104 which, when depressed, closes a first set of normally open contacts 105 of relay 103 thereby allowing voltage to be applied from the positive side of the battery 20 through a lead 28 and a variable resistor 106 to the lead 27. Similar bias sources are provided for local selector circuits 201 and 301 and like parts are identified by like numerals with the first numeral corresponding to the first numeral of the appropriate selector circuit. Contactors 104, 204, 304; contacts 105, 205, 305; and variable resistors 106, 206, 306 serve as selector means for applying a preselected voltage to inhibit and turn-on gates provided in each switching circuit as will be described presently.

The local selector circuit 101 is completed by a diode 107 and a capacitor 108 serially connected between the DC line 23 and the ground return lead 21. A second set of normally open contacts 109 of the relay 103 are connected across the diode 107 so that the capacitor 108 may discharge to maintain voltage on the lead 23 during the time that the contactor 110 is traveling between the contacts 109 and the contacts 102 after release of the pushbutton contactor 104 to which the contactor 110 is mechanically connected. Similar circuits are provided for the local selector circuits 201 and 301 as shown.

As indicated previously, a switching signal lead 25 is connected to one side of the output of amplifier 26. The other side of the amplifier output is connected by means of a lead 29 to the ground return lead 21. A resistor 30 is connected between the ground return lead 21 and, with the bias voltage lead 17 as described previously, to the one side of the amplifier input. The other side of the amplifier input is connected to a point between resistors 31 and 32 which are serially connected between switching signal lead 25 and the ground return lead 21. The resistors 31 and 32 form a voltage divider which provides a suitable bias voltage for the amplifier 26.

The switching circuit 100 may include a control rectifier such as silicon-controlled rectifier (SCR) 111 having its cathode electrode connected to ground lead 21 and its anode electrode connected through a utilization device such as load 112 to the DC energizing lead 23. The gate electrode of the SCR 111 is connected to the ground lead 21 by means of a suitable bias resistor 113. To the end that SCR will be rendered conducting when a voltage of appropriate value is applied to the switching signal lead 25 by the amplifier 26 the constant current, field effect diode (CCD) 114 and a common diode 115 are serially connected between the leads 25 and the gate electrode of SCR 111. The CCD 114 and the diode 115 serve as an "on" gate for SCR 111.

To prevent the SCR 111 from turning on when an inappropriate voltage appears on the switching signal lead 25, there is provided a PNP-type transistor 116 having its emitter electrode connected to ground lead 21, its collector electrode connected to a point between diodes 114 and 115 and having its base electrode connected to the switching signal lead 25 through a voltage-blocking means comprising a serially connected voltage breakdown device such as zener diode 117 and a constant current diode (CCD) 118. Suitable bias for the transistor 116 is provided by a resistor 119 connected between the ground lead 21 and the base electrode of the transistor 116. Transistor 116, zener diode 117 and CCD 118 serve as an inhibit gate for SCR 111.

The remote switching circuits 200 and 300 are substantially the same as switching circuit 100 except for zener diodes 220 and 320 connected between the CCD's 214, 314 and diodes 215, 315, respectively. The zener diodes 220 and 320 prevent the SCR's 211 and 311 from being turned on unless the voltage on the switching signal lead 25 is greater than some preselected value. A zener diode may be connected between the CCD 114 and the diode 115 of switching circuit 100 to serve the same function as zener diodes 220 and 320. However, a lower voltage limit is advantageously established by the voltage which must be applied to the gate electrode of SCR 111 without the need for such a diode in switching circuit 100.

If the loads 112, 212, and 312 draw different amounts of current from the DC source 20, it is possible to determine from the ammeter reading which of the switching circuits is activated. On the other hand, if the loads 112, 212 and 312 draw equal amounts of current it would not be possible to make such a determination. To the end that the switching circuit 100, 200 or 300 which is in operation may be identified by the reading on ammeter 24 when the loads 112, 212 and 312 are equal, resistors 221 and 321 are connected in parallel with loads 212 and 312, respectively. The resistors 221 and 321 are chosen so that each of the switching circuits causes a different reading on ammeter 24.

In remote switching circuit 200, zener diode 217 establishes the upper limit and zener diode 220 establishes the lower limit for the magnitude of voltage which must appear on switching signal lead 25 to turn on SCR 211. Accordingly, variable resistor 206 in the local selector circuit 201 must be adjusted so that amplifier 26 will produce an output voltage in that range when the contactor 204 is depressed.

The zener diodes 317 and 320 of switching circuit 300 likewise establish a voltage range having an upper limit and a lower limit. In switching circuit 100, zener diode 117 establishes an upper limit. The lower limit is established by whatever voltage is required to be applied to the gate of SCR 111 to make it conduct. If desired, a zener diode may be connected between the CCD 114 and diode 115 to establish a lower limit for switching circuit 100. It will be seen that each of the variable resistors 106, 206 and 306 must be adjusted so that when contactors 104, 204 or 304 are depressed amplifier 26 will produce a voltage on switching signal lead 25 in a range that will activate either switching circuit 100, 200 or 300, respectively.

Operation of the foregoing circuitry will now be described. Assume now that load 212 is energized and SCR 211 is conducting. If, for example, contactor 304 is now depressed to close contacts 305, contactor 310 will close contacts 309 and open contacts 302. The opening of contact 302 interrupts current flowing from the DC source 20 through the ammeter, DC energizing lead 23, load 212 and the SCR 211, causing the latter to turn off. The closing of contacts 309 by the contactor 310 causes capacitor 308 to become charged to battery potential. The closing of contacts 305 by the contactor 304 causes a preselected bias voltage as determined by the setting of the variable resistor 306 be applied to the input of amplifier 26. The amplified bias voltage then appears on the switching signal lead 25 and, being less than the upper limit of the gating voltage for SCR 311 but greater than the lower limit of the gating voltage causes current to flow from the lead 25 into the gate electrode of SCR 311 via CCD 314, zener diode 320 and diode 315. This causes SCR 311 to conduct.

The magnitude of voltage which was produced on the switching signal lead 25 to render SCR 311 conducting must be greater than the upper limit of the gating voltage for SCR's 111 and 211. Thus the switching voltage which rendered SCR 311 conducting will be greater than the breakdown voltage of zener diode 217 thereby causing transistor 216 to conduct. Conduction of transistor 216 directs to the ground lead 21 any current which might be supplied to the gate electrode of SCR 211 through CCD 214 and zener diode 220 thereby inhibiting conduction of SCR 211. Similarly, transistor 116 is rendered conducting to inhibit conduction of SCR 111.

When the contactor 304 is released, contacts 305 are opened thereby removing input from amplifier 26 so that switching signal voltage is removed from the lead 25. As the contactor 310 opens contacts 309, capacitor 308 discharges through diode 307 to maintain current flow through load 312 and SCR 311 to prevent SCR 311 from turning off during the brief period of time that contactor 310 is traveling from contacts 309 to contacts 302.

While only three remote switching circuits and three associated local selector circuits are shown in the single FIGURE, additional switching circuits and selector circuits may be added as desired. As indicated previously, each of the switching circuits has an upper and a lower gating voltage limit. The voltage developed on switching signal lead 25 must fall within one of these bands of voltage to activate a switching circuit. Each band of voltage has different upper and lower limits and furthermore, there is no overlap on the bands of voltage. Which one of the switching circuits 100, 200 or 300 is activated depends upon the variable resistors 106, 206 and 306 being adjusted so that the amplifier 26 produces an output voltage that falls within a voltage band of the switching circuit corresponding to the local selector circuit in which a contactor is depressed. X It will be understood that the foregoing circuitry may be changed and modified by those skilled in the art, as for example changing polarities and types of semiconductors, without departing from the spirit and scope of the invention as set forth in the claims appended hereto.

What is claimed is:

1. In a circuit for selectively, successively energizing any one of a plurality of loads from a DC source, in combination, a plurality of current switches each having power electrodes and a gate electrode, means for connecting the power electrodes of said switches between one side of respective ones of said loads and one side of said DC source, first switch means connected between the other side of each of said loads and the other side of said DC source, a plurality of bias voltage sources, a plurality of turn-on gates each turn-on gate being connected to a respective one of said electrodes of said current switches, a plurality of inhibit gates each being connected to a respective one of said gate electrodes of said current switches, and second switch means for selectively connecting one of said bias voltage sources to said turn-on gates and to said inhibit gates.

2. The circuitry of claim 1 wherein each of said turn-on gates comprises a serially connected constant current device, a voltage breakdown device, and a common diode, said common diode being connected between said voltage breakdown device and a said gate electrode of a said current switch, said constant current diode being connected to said second switch means.

3. The circuit of claim 2 wherein said voltage breakdown device is a zener diode.

4. The circuit of claim 2 wherein said constant current device is a constant current diode.

5. The circuit of claim 1 wherein each of said inhibit gates comprises a transistor having a collector electrode connected to a respective turn-on gate, an emitter electrode connected to said one side of said DC source and a base electrode connected through a voltage breakdown device and a constant current device to a switching signal lead, said switching signal lead being connected between said second switch means and each of said turn-on gates and said inhibit gates.

6. The circuit of claim 5 wherein said voltage breakdown device is a zener diode.

7. The circuit of claim 5 wherein said constant current device is a constant current diode.

8. The circuit of claim 1 wherein said first switch means comprises a plurality of first, normally closed contact sets, each having a contactor, one contact set being provided for each of said current switches, said contact sets being in series relationship whereby the opening of any contact set removes DC voltage from all of said loads.

9. The circuit of claim 8 wherein said first switch means includes a plurality of normally open contact sets each of which is disposed to be closed by a said contactor of an associated one of said normally closed contact sets when a said contactor is depressed, a common diode and a capacitor serially connected between one side of each of said normally closed contact sets and said one side of said DC source, and means for connecting each of said diodes across a respective one of said normally open contact sets of said first switch means, said diodes being poled to discharge the capacitor with which it is connected when an associated one of said normally open contact sets is open.

10. The circuit of claim 1 wherein said second switch means comprises a plurality of normally open contact sets each having a contactor which closes its associated contact set when manually depressed, each of said contact sets being connected between a respective one of said bias voltage sources and all of said turn-on and said inhibit gates.

11. The circuit of claim 1 wherein said current switches are unidirectional current conducting devices.

12. The circuitry of claim 1 and further including an amplifier connected between said second switch means and said turn-on and said inhibit gates.

13. The circuitry of claim 1 and further including an ammeter connected between said first switch means and said other side of said DC source.